Hull & Stiffler,
Clover Harvester.

No. 111,544.   Patented Feb. 7, 1871.

Witnesses:
M. Vorlander
L. S. Mabee

Inventor:
J. W. Hull
H. G. Stiffler
per Mmm & Co
Attorneys.

United States Patent Office.

JOHN W. HULL AND ALBERT G. STIFFLER, OF ALQUINA, INDIANA.

Letters Patent No. 111,544, dated February 7, 1871.

IMPROVEMENT IN CLOVER-HARVESTERS.

The Schedule referred to in these Letters Patent and making part of the same.

*To all whom it may concern:*

Be it known that we, JOHN W. HULL and ALBERT G. STIFFLER, of Alquina, in the county of Fayette and State of Indiana, have invented a new and improved Clover-Stripper; and we do hereby declare that the following is a full, clear, and exact description thereof, which will enable others skilled in the art to make and use the same, reference being had to the accompanying drawing forming part of this specification.

Our invention relates to clover-strippers, and consists in a new mode of sustaining the rake and cutter while being lifted over the clover-heads.

Similar letters of reference indicate corresponding parts.

Figure 1:
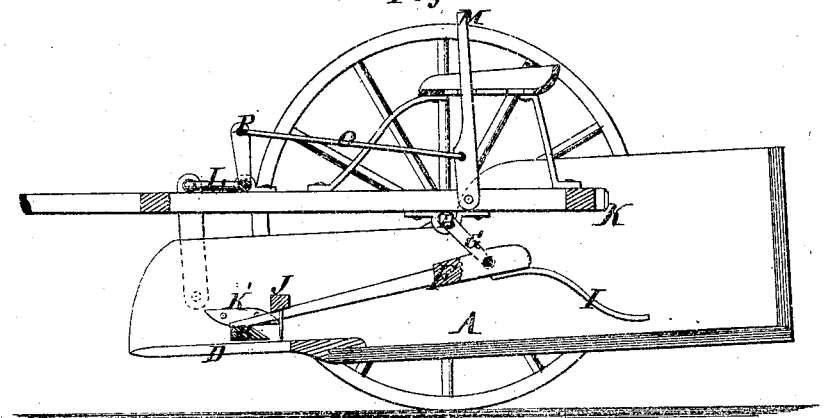
Figure 1 is a longitudinal sectional elevation of our improved machine.
Figure 2:
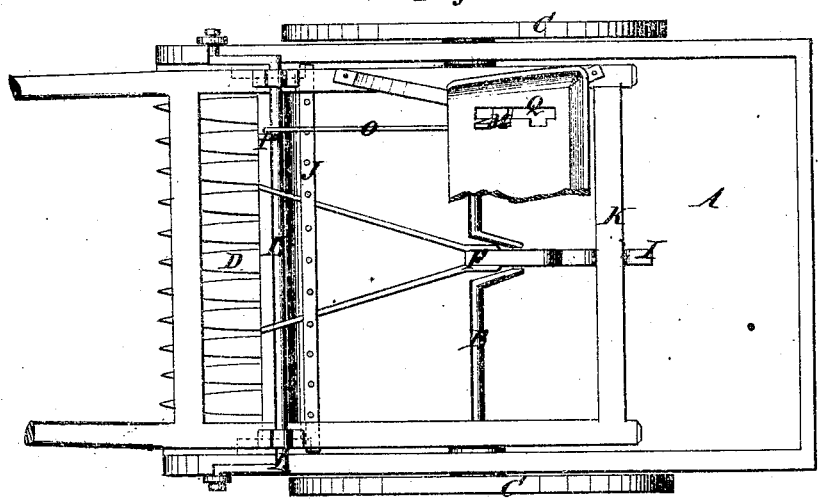
Figure 2 is a plan view of the same.

A is the box or case for receiving the heads. It is open at the front, and suspended from the outer axle B of a pair of wheels, C, on which it is drawn along the ground.

D represents fingers applied to the front of the bottom of the case, resembling in some respects the guard-fingers of a mower.

E is a long cutter placed above the fingers, and arranged to cut backward against the angles between the fingers. It is connected by a crotched bar, F, with a crank, G, in the axle, which is revolved by one of the wheels, and said bar has a strong bent spring, I, extending rearward from the crank, which is caused to strike against the cross-bar K, when, after pulling the rake J, also attached to bar F, and cutter-back, it rises upward and throws them forward again, by which they are raised up so as to be moved over the clover-heads in going forward.

Guide-blocks K' are provided, one on each inner side of the box, for the ends of the cutter-bar to work under to hold it down to its work when going backward, and to assist the spring in holding it up in going forward. The rake and bar being connected together, work alike in this respect.

The spring I escapes from under the bar K just previous to the end of the forward movement of the cutter, and allows the latter to fall down to its work previous to moving back.

As it is desirable to vary the height of the fingers and the cutter as the height of the clover varies, the front end of the case is suspended from a crank-shaft, L, mounted on the shafts of the truck, which shaft is connected to a hand-lever, M, by a rod, O, and arm, P, so that it may be turned to raise and lower the front end of the case, and the lever is arranged to rise up through a slot, Q, in the bottom of the driver's seat, which is notched along the slot to hold the lever in the position required.

The heads are gathered into the rear part of the case by the action of the cutter and rake as the work progresses, and are removed therefrom from time to time,

Having thus described our invention,

We claim as new and desire to secure by Letters Patent—

The bar K, spring I, and guide-blocks K', combined, as described, with crotched bar F, to sustain the elevation of the rake and cutter until they have been lifted over the clover-heads.

JOHN W. HULL.
ALBERT G. STIFFLER.

Witnesses:
J. R. DARTER,
H. H. MAZE.